(12) United States Patent
Li et al.

(10) Patent No.: US 12,086,404 B2
(45) Date of Patent: Sep. 10, 2024

(54) VOLUME ADJUSTING GESTURE AND MISTOUCH PREVENTION ON ROLLING DEVICES

(71) Applicant: Huawei Technologies Co., Ltd., Shenzhen (CN)

(72) Inventors: Ming Li, Helsinki (FI); Ye Yang, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/794,892

(22) PCT Filed: Jan. 24, 2020

(86) PCT No.: PCT/EP2020/051759
§ 371 (c)(1),
(2) Date: Jul. 22, 2022

(87) PCT Pub. No.: WO2021/148133
PCT Pub. Date: Jul. 29, 2021

(65) Prior Publication Data
US 2022/0398008 A1    Dec. 15, 2022

(51) Int. Cl.
*G06F 3/04883* (2022.01)
*G06F 1/16* (2006.01)
*G06F 3/16* (2006.01)

(52) U.S. Cl.
CPC ........ *G06F 3/04883* (2013.01); *G06F 1/1652* (2013.01); *G06F 3/165* (2013.01); *G06F 2203/04808* (2013.01)

(58) Field of Classification Search
None
See application file for complete search history.

(56) References Cited

U.S. PATENT DOCUMENTS

| 8,723,824 | B2 | 5/2014 | Myers et al. | |
|---|---|---|---|---|
| 2013/0038548 | A1* | 2/2013 | Kitada | G06F 3/04883 345/173 |
| 2013/0120262 | A1* | 5/2013 | Piot | G06F 3/03547 345/163 |
| 2013/0321337 | A1 | 12/2013 | Graham et al. | |
| 2014/0298237 | A1 | 10/2014 | Galu, Jr. | |

(Continued)

FOREIGN PATENT DOCUMENTS

| CN | 110531864 A | 12/2019 |
|---|---|---|
| KR | 20140075391 A | 6/2014 |

(Continued)

*Primary Examiner* — Matthew Ell
*Assistant Examiner* — David V Luu
(74) *Attorney, Agent, or Firm* — Slater Matsil, LLP

(57) ABSTRACT

A device and method for controlling the audio level of a device are provided. The device includes a housing, a roll unit mounted such that it is able to rotate in the housing, a flexible, touch-sensitive display configured to be rolled on the roll unit around a roll axis so that a first, curved portion of the display forms a side screen bent around the roll unit, and a second, planar portion of the display forms a front screen, wherein the area of the front screen changes according to a rotation of the roll unit, and a controller configured to adjust, in response to detecting a predefined multi-touch gesture on the side screen, an audio output volume of the device.

19 Claims, 4 Drawing Sheets

(56) References Cited

U.S. PATENT DOCUMENTS

| | | | |
|---|---|---|---|
| 2015/0002424 A1* | 1/2015 | Yamamoto | G06F 3/04166 |
| | | | 345/173 |
| 2015/0062027 A1* | 3/2015 | Yang | G06F 3/04883 |
| | | | 345/173 |
| 2015/0261376 A1 | 9/2015 | Kim et al. | |
| 2015/0339026 A1* | 11/2015 | Phang | H04N 21/42222 |
| | | | 348/552 |
| 2016/0026324 A1* | 1/2016 | Wu | G06F 21/31 |
| | | | 345/173 |
| 2016/0371046 A1* | 12/2016 | Komiyama | G06F 1/1649 |
| 2017/0115796 A1* | 4/2017 | Jiang | G06F 3/04883 |
| 2017/0185170 A1* | 6/2017 | Magi | G06F 3/017 |
| 2018/0095647 A1* | 4/2018 | Chesnokov | G06F 3/04883 |
| 2021/0250439 A1* | 8/2021 | Sun | G06F 3/04883 |
| 2022/0326843 A1* | 10/2022 | Ji | G06F 3/04845 |

FOREIGN PATENT DOCUMENTS

| | | |
|---|---|---|
| KR | 20160118078 A | 10/2016 |
| KR | 20170017850 A | 2/2017 |
| KR | 20190062855 A | 6/2019 |

\* cited by examiner

VOLUME ADJUSTING GESTURE AND MISTOUCH PREVENTION ON ROLLING DEVICES

CROSS-REFERENCE TO RELATED APPLICATIONS

This application is a national stage of International Application No. PCT/EP2020/051759, filed on Jan. 24, 2020, which is hereby incorporated by reference in its entirety.

TECHNICAL FIELD

The disclosure relates generally to rollable display devices with audio output units, more particularly to methods and devices for detecting a gesture on a rollable display for adjusting audio output volume of the device.

BACKGROUND

Consumer interest in large and bright display devices and therefore demand for display devices that are conveniently portable and stored is increasing. A flexible display panel provides a solution for portability using a display panel in which a plurality of pixels are disposed on a flexible substrate such as a plastic film instead of a rigid substrate, and thus may be easily bent.

Accordingly, rollable display devices, foldable display devices, and expandable display devices, and the like that use a flexible display panel have been developed. Such rollable display devices comprise a flexible display panel that may be expanded to increase usable screen area and may be rolled in to a compact position to increase portability, using a roll unit for supporting a curved portion of the flexible display panel to be rolled around the roll unit, and a driving module for rotating the roll unit in response to a driving signal. Some rollable display devices include a touch-sensitive flexible display panel that can also function as input device by detecting touch gestures.

A problem with such rollable display devices is however that the side of the device where control buttons would normally be placed (e.g. to control audio output volume) forms part of the flexible display panel and is therefore not fixed. Furthermore, there is no option to provide fixed control buttons anywhere near the side of the device where it would be intuitive for a user to use them for e.g. volume control. Providing dedicated input regions on a touch-sensitive display panel further presents a problem of the user accidentally adjusting the volume by involuntarily touching the display in the dedicated region.

Thus, a need exists to provide a solution that enables a user to provide intuitive input for adjusting volume of a media content played on a rollable display device while also avoiding accidental adjustment of the volume.

SUMMARY

It is therefore an object to provide a method and device for detecting a user gesture on a rollable display for adjusting audio output volume which overcomes or at least reduces the problems mentioned above.

The foregoing and other objects are achieved by the features of the independent claims. Further implementation forms are apparent from the dependent claims, the description and the figures.

According to a first aspect, there is provided a device comprising: a housing; a roll unit mounted rotatably in the housing; a flexible, touch-sensitive display configured to be rolled on the roll unit around a roll axis so that a first, curved portion of the display forms a side screen bent around the roll unit, and a second, planar portion of the display forms a front screen, wherein the area of the front screen changes according to a rotation of the roll unit; and a controller configured to, in response to detecting a predefined multi-touch gesture on the side screen, adjust an audio output volume of the device.

Detecting a predefined multi-touch gesture on the curved side portion of a rollable display provides an intuitive input method for users (in a typical smartphone device physical volume keys are generally provided on the side portion of the device) for adjusting the volume of a media content played on a rollable display device, without requiring any special hardware or additional user interface (UI) elements on the device itself.

In one embodiment the predefined multi-touch gesture comprises two touch inputs detected simultaneously on the side screen, and a predefined movement of at least one of the two touch inputs.

Limiting the type of multi-touch gesture for adjusting the audio output volume to two simultaneously detected touch inputs with a predefined movement enables avoiding accidental volume adjustments by the user holding the device.

In a possible implementation form of the first aspect the predefined movement comprises a sliding movement detected substantially parallel to the roll axis, and the controller is configured to only detect the multi-touch gesture if the distance of the sliding movement is greater than half of the length of the side screen, wherein the length is measured parallel to the roll axis, to further improve avoiding accidental volume adjustments.

In a further possible implementation form of the first aspect the predefined movement comprises a sliding movement of two touch inputs in opposite directions, wherein the distance of the sliding movement is defined as the combined movement distance of the two touch inputs; and the controller is configured to:

increase the audio output volume to a maximum level when detecting the two touch inputs sliding away from each other, and to decrease the audio output volume to a minimum level when detecting the two touch inputs sliding towards each other.

The gesture allows a user to adjust the volume quickly and precisely without accidental volume adjustments.

In a further possible implementation form of the first aspect the predefined movement comprises a sliding movement of two touch inputs in the same direction and by the same distance; and the controller is configured to:

increase the audio output volume to a maximum level when detecting the two touch inputs sliding from a bottom portion of the side screen to a top portion of the side screen, and to decrease the audio output volume to a minimum level when detecting the two touch inputs sliding from a top portion of the side screen to a bottom portion of the side screen; wherein the top and bottom portions are defined as opposite portions of the side screen along the roll axis, determined relative to the orientation of the device.

The gesture allows a user to adjust the volume quickly and precisely without accidental volume adjustments.

In a further possible implementation form of the first aspect the predefined movement comprises a sliding movement of a moving touch input relative to a stationary touch input; and the controller is configured to: increase the audio output volume to a higher level when detecting the moving touch input sliding away from the stationary touch input, and to decrease the audio output volume to a lower level when detecting the moving touch input sliding towards the stationary touch input.

The gesture allows a user to gradually adjust the volume in a level-by-level manner without accidental volume adjustments.

In a further possible implementation form of the first aspect the controller is configured to determine an amount of adjustment of the audio output volume in proportion to a distance of the predefined movement of the at least one of the two touch inputs. This allows further precision in the volume adjustments.

In a further possible implementation form of the first aspect the controller is configured to determine the amount of adjustment of the audio output volume in proportion to a speed s of the predefined movement of the at least one of the two touch inputs. This allows further precision in the volume adjustments.

In a further possible implementation form of the first aspect the controller is configured to only detect the multi-touch gesture if a measured speed of predefined movement is greater than a predefined speed threshold. This allows to further limit accidental volume adjustments.

In a further possible implementation form of the first aspect the predefined movement comprises a double-tap gesture, wherein two touch inputs are detected on the side screen simultaneously in a first instance, and again in a second instance, and the controller is configured to only detect the multi-touch gesture if a time interval elapsed between the first instance and the second instance is longer than a predefined time threshold. The gesture allows a user to adjust the volume quickly and precisely without accidental volume adjustments.

In a further possible implementation form of the first aspect the controller is configured to: increase the audio output volume to a maximum level if the double-tap gesture is detected in a top portion of the side screen, and to decrease the audio output volume to a minimum level if the double-tap gesture is detected in a bottom portion of the side screen, wherein the top and bottom portions are defined as opposite portions of the side screen along the roll axis, determined relative to the orientation of the device.

In a further possible implementation form of the first aspect the controller is configured to only detect the multi-touch gesture if it occurs in a central portion of the side screen, the central portion being defined by extending within a predefined distance from a centerline of the side screen parallel with the roll axis. In an embodiment the predefined distance is determined so that the area of the central portion is between 70% and 90% of the area the side screen, more preferably 80% of the area the side screen. This allows to further limit accidental volume adjustments.

In a further possible implementation form of the first aspect the display is configured to be rolled on the roll unit between a rolled-in state and a rolled-out state to various extents, wherein the location of the side screen with respect to the edges of the display changes according to what extent the display is rolled out.

In a further possible implementation form of the first aspect a third, planar portion of the display forms a back screen, wherein the area of the back screen changes according to a rotation of the roll unit.

According to a second aspect, there is provided method for controlling audio output volume of a rolling display device, the method comprising:

providing a device according to any one of the possible implementation forms of the first aspect, the device comprising a flexible, touch-sensitive display, a curved portion of the display forming a side screen; detecting a predefined multi-touch gesture on the side screen; and adjusting an audio output volume of the device in accordance with the controller configuration the device.

These and other aspects will be apparent from and the embodiment(s) described below.

BRIEF DESCRIPTION OF THE DRAWINGS

In the following detailed portion of the present disclosure, the aspects, embodiments and implementations will be explained in more detail with reference to the example embodiments shown in the drawings, in which.

DETAILED DESCRIPTION OF ILLUSTRATIVE EMBODIMENTS

Figure 1:
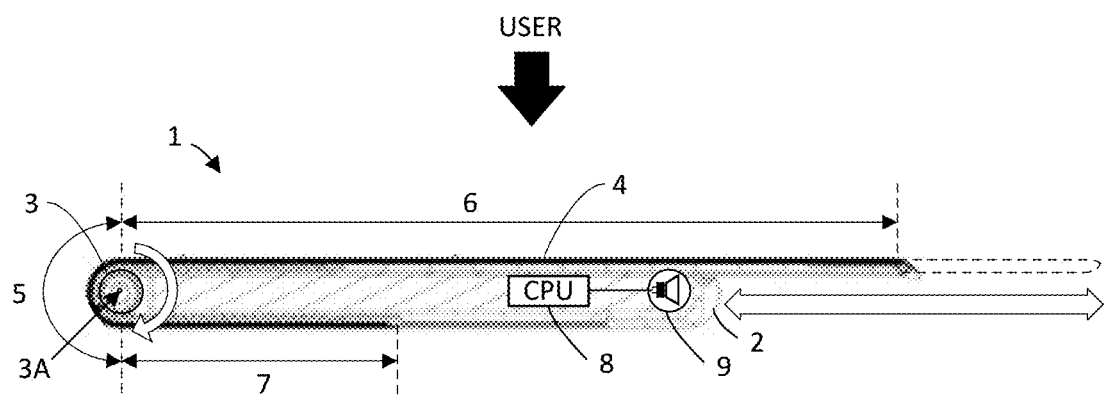
FIG. 1 shows a cross-sectional view of a rolling display device in accordance with an embodiment of the first aspect.

FIG. 1 illustrates a rolling display device 1 in accordance with the present disclosure through a cross-sectional view. The device 1 comprises a housing 2 and a roll unit 3 rotatably mounted in the housing 2. The device 1 further comprises a flexible, touch-sensitive display 4 configured to be rolled on the roll unit 3 around a roll axis 3A. As shown in FIG. 1, a first, curved portion of the display 4 forms a side screen 5 bent around the roll unit 3, and a second, planar portion of the display 4 forms a front screen 6 facing a user. The area of the front screen 6 changes according to a rotation of the roll unit 3.

In one embodiment the display 4 is configured to be rolled on the roll unit 3 between a rolled-in state and a rolled-out state to various extents (as shown in dotted lines), wherein the location of the side screen 5 changes according to what extent the display 4 is rolled out, with respect to the edges of the display 4.

A third, planar portion of the display 4 may form a back screen 7, wherein the area of the back screen 7 may also change according to a rotation of the roll unit 3.

The device 1 further comprises a controller 8 connected to an audio output and configured to, in response to detecting a predefined multi-touch gesture 10 on the side screen 5, adjust an audio output volume 9 of the device 1.

Multi-touch is technology that enables a touch screen to recognize the presence of more than one point of contact with the screen surface, whereby a multi-touch gesture in this case is made by multiple points of contact (e.g. a finger of a user) touching the rollable touch-sensitive display with or without an accompanying movement of the points of contact (fingers) on the display. These multi-touch gestures help users perform tasks quickly and intuitively on e.g. mobile devices.

In an embodiment, the device 1 is a smart device. The smart device could be a smartphone (preferred embodiment) or any other smart device such as a smart television, a smart watch, and the like.

Figure 2:
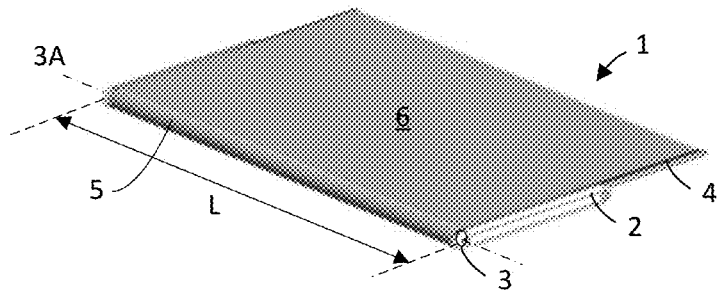
FIG. 2 shows an isometric view of a rolling display device in accordance with an embodiment of the first aspect.

FIG. 2 shows the rolling display device 1 in accordance with the present disclosure in a 3D isometric view, illustrating how the length L of the side screen is measured parallel to the roll axis 3A. Features that are the same or similar to corresponding features previously described or shown herein and below are denoted by the same reference numeral as previously used for simplicity.

In an embodiment, the predefined multi-touch gesture 10 for adjusting the audio output volume 9 of the device 1 comprises two touch inputs 11 detected simultaneously on the side screen 5, along with a predefined movement 12 of the at two touch inputs 11.

Figure 3A:
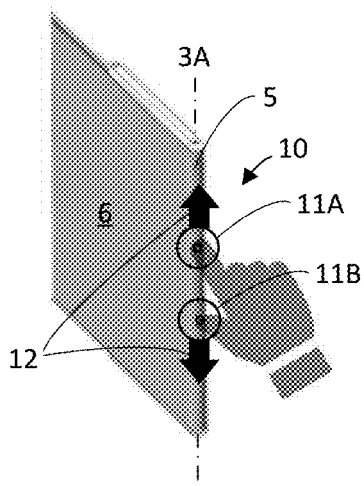
FIGS. 3A and 3B show side views of a rolling display device in accordance with further embodiments of the first aspect.
Figure 3B:
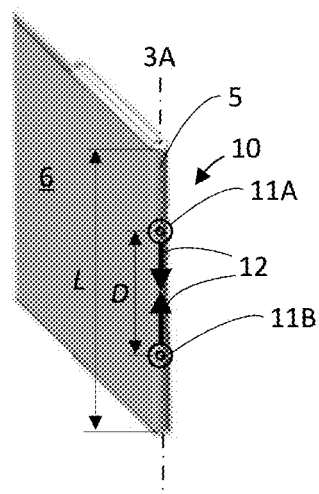

FIGS. 3A and 3B illustrate an embodiment of the device 1, wherein the predefined movement 12 comprises a sliding movement detected on the side screen 5 in opposite directions, and substantially parallel to the roll axis 3A. In this embodiment, the predefined multi-touch gesture 10 includes either the two touch inputs 11A, 11B sliding away from each other as shown in FIG. 3A (also known as a "pinch and spread" gesture), or the two touch inputs 11A, 11B sliding towards each other as shown in FIG. 3B (also known as a "pinch together" gesture).

As further illustrated in FIG. 3B, the distance D of the sliding movement in this embodiment is defined as the combined movement distance of the two touch inputs 11A, 11B. In certain embodiments, the controller 8 is configured to only detect the multi-touch gesture 10 if the detected distance D of the sliding movement of the two touch inputs 11A, 11B is greater than half of the length L of the side screen 5 (D>0.5 L).

Figure 4A:
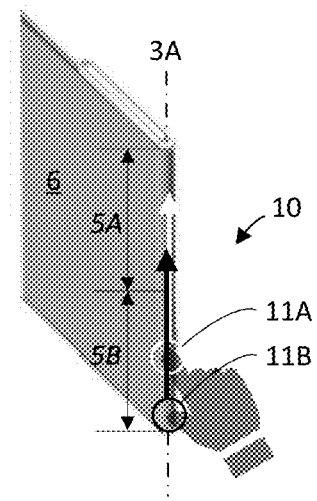
FIGS. 4A and 4B show side views of a rolling display device in accordance with further embodiments of the first aspect.
Figure 4B:
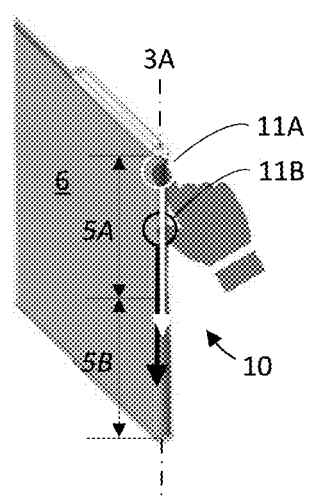

FIGS. 4A and 4B illustrate an embodiment of the device 1, wherein the predefined movement 12 comprises a sliding movement detected on the side screen 5 in the same direction, by substantially the same distance D, and substantially parallel to the roll axis 3A. In this embodiment, the predefined multi-touch gesture 10 includes either the two touch inputs 11A, 11B sliding from a bottom portion 5B of the side screen 5 to a top portion 5A of the side screen 5 as shown in FIG. 4A, or the two touch inputs 11A, 11B sliding from a top portion 5A of the side screen 5 to a bottom portion 5B of the side screen 5 as shown in FIG. 4B, wherein the top and bottom portion 5Bs are defined as opposite portions of the side screen 5 along the roll axis 3A, determined relative to the orientation of the device 1.

Figure 5:
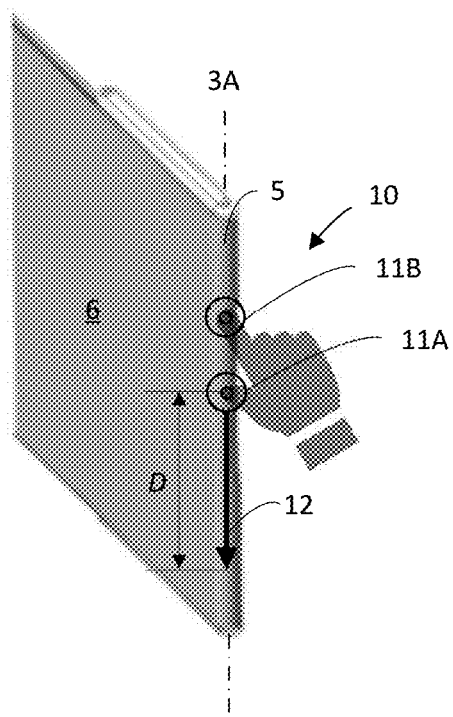
FIG. 5 shows a side view of a rolling display device in accordance with another embodiment of the first aspect.

FIG. 5 illustrates an embodiment of the device 1, wherein the predefined movement 12 comprises a sliding movement of a moving touch input 11A relative to a stationary touch input 11B detected on the side screen 5, substantially parallel to the roll axis 3A. The moving touch input 11A may be detected sliding either away from or towards the stationary touch input 11B, and the sliding distance in this embodiment is defined as the distance traveled by the moving touch input 1A.

Figure 6:
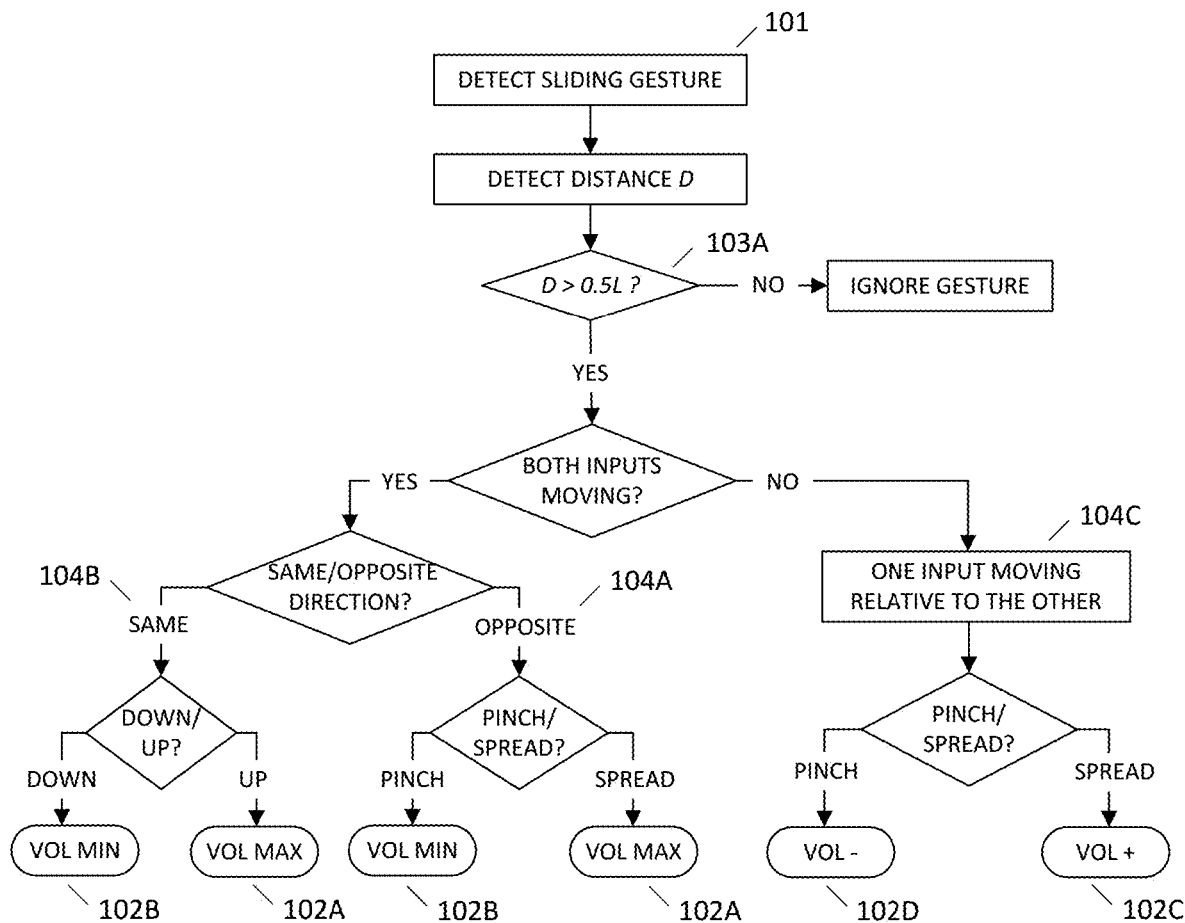
FIG. 6 shows a flow diagram illustrating the functioning of a rolling display device in accordance with an embodiment of the second aspect.
Figure 7:
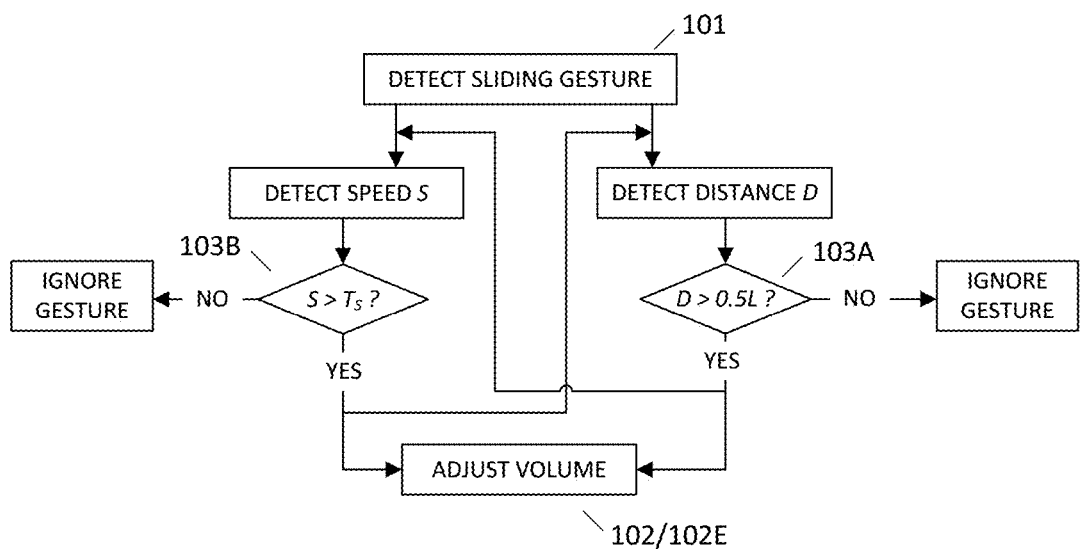
FIG. 7 shows a flow diagram illustrating the functioning of a rolling display device in accordance with another embodiment of the second aspect.
Figure 8:
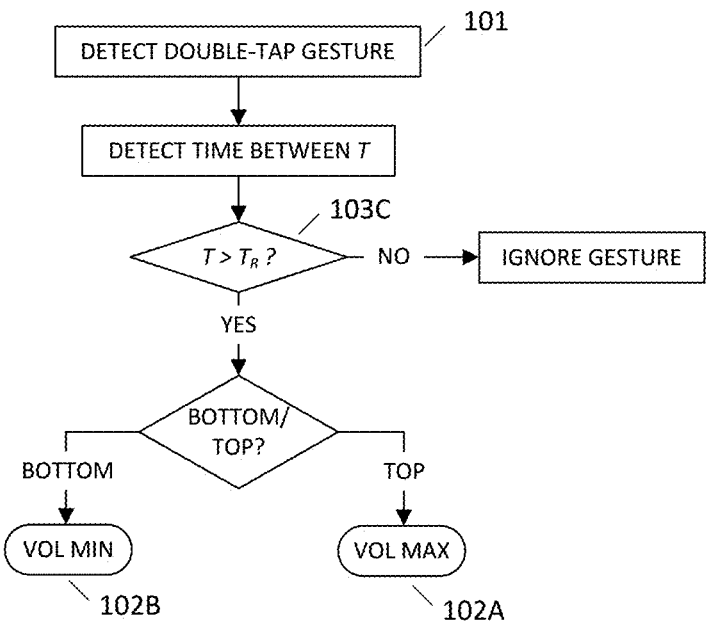
FIG. 8 shows a flow diagram illustrating the functioning of a rolling display device in accordance with another embodiment of the second aspect.

FIGS. 6-8 show flow diagrams illustrating the functioning of different embodiments of the rolling display device based on different configurations of the controller 8, in accordance with the present disclosure, and based on detecting different predefined multi-touch gestures 10 as defined above.

FIG. 6 illustrates embodiments of the device 1 which can be implemented separately or combined as one controller configuration. In a first step 101 a predefined multi-touch gesture 10 is detected on the side screen 5 as described above. In this embodiment the predefined multi-touch gesture 10 comprises two touch inputs 11 detected simultaneously on the side screen 5, and a predefined movement 12 of at least one of the two touch inputs 11, wherein the predefined movement 12 comprises a sliding movement detected substantially parallel to the roll axis 3A with a detected distance D.

In a next step 103A the controller 8 compares the detected distance D with the length of the side screen 5 and only interprets the gesture as valid if the distance D of the sliding movement is greater than half of the length L of the side screen 5 (D>0.5 L), otherwise the gesture is ignored.

In an embodiment as described above in relation to FIG. 5, the predefined movement 12 is detected 104C as a sliding movement of one moving touch input 11A relative to a stationary touch input 11B, wherein the controller 8 is configured to either increase 102C the audio output volume 9 to a higher level when detecting the moving touch input 11A sliding away from the stationary touch input 11B, or to decrease 102D the audio output volume 9 to a lower level when detecting the moving touch input 11A sliding towards the stationary touch input 11B.

According to this embodiment, the volume is gradually increased or decreased in a level-by-level (namely, step-wise) manner. Step-wise volume adjustment refers to increasing or decreasing the volume by one or more levels.

For example, if volume levels for the device 1 vary from 0 to 10 in steps of 1, and an exemplary initial volume level of the device is level 5, a level-by-level increase of volume would change volume levels of the device as levels 6, 7, 8, 9, and 10; whereby a level-by-level decrease of volume would change volume levels of the device as levels 4, 3, 2, 1, and 0.

Notably, movement of the two touch inputs 1A, 11B for adjusting volume according to embodiments described above in relation to FIGS. 3-4 is different from the embodiment shown in FIG. 5. In particular, both touch inputs 11A, 11B of the user that touch the side screen 5 are moved for volume adjustment according to the first manner, whereas only touch input 11A of the two touch inputs that touch the side screen 5 is moved for volume adjustment according to the second manner. This allows for clearly differentiating extreme volume adjustment from gradual volume adjustment.

In an embodiment the controller 8 is configured to determine an amount of adjustment of the audio output volume 9 in proportion to a distance D of the predefined movement 12 of the moving touch input 11A relative to a stationary touch input 11B.

In an embodiment as described above in relation to FIGS. 4A and 4B, the predefined movement 12 is detected 104B as a sliding movement of two touch inputs 11A, 11B in the same direction, wherein the controller 8 is configured to increase 102A the audio output volume 9 to a maximum level when detecting the two touch inputs 11A, 11B sliding from a bottom portion 5B of the side screen 5 to a top portion 5A of the side screen 5, and to decrease 102B the audio output volume 9 to a minimum level when detecting the two touch inputs 11A, 11B sliding from a top portion 5A of the side screen 5 to a bottom portion 5B of the side screen 5.

In an embodiment as described above in relation to FIGS. 3A and 3B, the predefined movement 12 is detected 104A as a sliding movement of two touch inputs 1A, 11B in opposite directions, wherein the controller 8 is configured to increase 102A the audio output volume 9 to a maximum level when detecting the two touch inputs 11A, 11B sliding away from each other, and to decrease 102B the audio output volume 9 to a minimum level when detecting the two touch inputs 11A, 11B sliding towards each other.

Notably, these gestures for muting or maximizing the volume are intuitive. Upon performing the "pinch together" gesture, a separation between the two touch inputs 11A, 11B is reduced considerably. This is indicative of minimizing (namely, muting) volume. Alternatively, upon performing the "pinch and spread gesture", a separation between the two touch inputs 11A, 11B is increased considerably. This is indicative of maximizing volume. The user thus need not specially memorize any complex gesture pattern for muting or maximizing the audio output volume.

FIG. 7 illustrates further embodiments of the device 1 which can be implemented separately or combined as one controller configuration. In a first step 101 a predefined multi-touch gesture 10 is detected on the side screen 5 as described above. In this embodiment the predefined multi-touch gesture 10 comprises two touch inputs 11 detected simultaneously on the side screen 5, and a predefined movement 12 of at least one of the two touch inputs 11, wherein the predefined movement 12 comprises a sliding movement detected substantially parallel to the roll axis 3A.

In one embodiment, as described above, the controller 8 compares 103A the detected sliding distance D of the touch input(s) 11 with the length of the side screen 5 and only interprets the gesture as valid if the distance D of the sliding movement is greater than half of the length L of the side screen 5 (D>0.5 L), otherwise the gesture 10 is ignored.

In another embodiment, the controller 8 compares 103B a measured speed S of predefined movement 12 of the touch input(s) ii with a predefined speed threshold Ts, and only interprets the gesture as valid if the speed S is greater than the predefined speed threshold (S>Ts), otherwise the gesture 10 is ignored.

In case any or both of the comparisons result in a valid multi-touch gesture 10, the controller adjusts 102 the audio output volume 9 of the device 1 based on the detected multi-touch gesture 10.

In an embodiment the controller 8 is further configured to determine 102E the amount of adjustment of the audio output volume 9 in proportion to a speed S of the predefined movement 12 of the at least one of the two touch inputs 11.

Notably, a slow sliding motion enables adjustment of volume by one volume level in an embodiment as illustrated in FIG. 5, whereas a fast sliding motion enables adjustment of volume by two volume levels. Therefore, a step of level-by-level volume adjustment is directly related to the speed of sliding on the side screen 5. Greater the speed of sliding, greater is a step size of level-by-level volume adjustment.

FIG. 8 illustrates a further embodiment of the device 1 wherein the predefined movement 12 comprises a "double-tap" gesture, wherein two touch inputs 11 are detected on the side screen 5 simultaneously in a first instance, and again in a second instance. In this embodiment the controller 8 is configured to increase 102A the audio output volume 9 to a maximum level if the double-tap gesture is detected in a top portion 5A of the side screen 5, and to decrease 102B the audio output volume 9 to a minimum level if the double-tap gesture is detected in a bottom portion 5B of the side screen 5, wherein the top and bottom portions 5A, 5B are defined as opposite portions of the side screen 5 along the roll axis 3A, determined relative to the orientation of the device 1, as shown in FIGS. 4A and 4B.

In this embodiment the controller 8 may be further configured to only detect 103C the multi-touch gesture 10 if a time interval T elapsed between the first instance and the second instance is longer than a predefined time threshold Tr (T>Tr), otherwise ignore the gesture 10.

Figure 9:
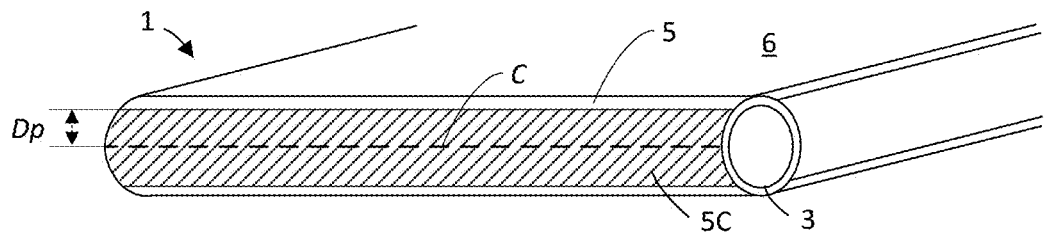
FIG. 9 shows a side view of a rolling display device in accordance with another embodiment of the first aspect.
Figure 10:
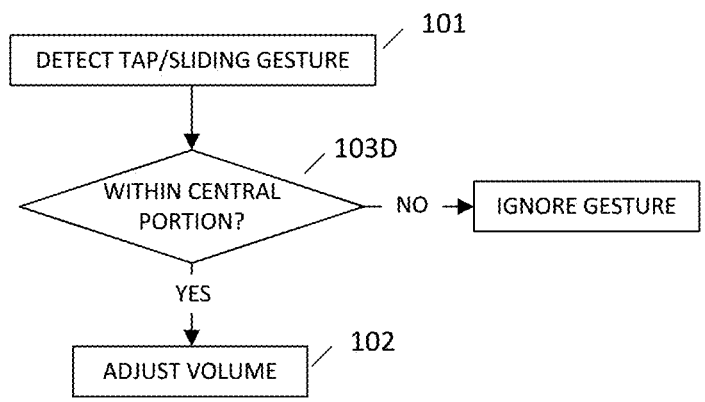
FIG. 10 shows a flow diagram illustrating the functioning of a rolling display device in accordance with another embodiment of the second aspect.

FIGS. 9 and 10 illustrate through a side view (FIG. 9) and a functional flow chart (FIG. 10) a rolling display device 1 in accordance with another embodiment, wherein the controller 8 is configured to only detect 103D the multi-touch gesture 10 if it occurs in a central portion 5C of the side screen 5, the central portion 5C being defined by extending within a predefined distance Dp from a centerline C of the side screen 5 parallel with the roll axis 3A. In an embodiment the predefined distance Dp is determined so that the area of the central portion 5C is between 70% and 90% of the area the side screen 5, more preferably 80% of the area the side screen 5.

In a further optional embodiment, the side screen 5 may display a virtual UI icon that facilitates adjustment of audio output volume by a multi-touch gesture. The virtual UI icon may be displayed when 2 fingers of a user touch the display. A length of the virtual UI icon may be selected to be slightly larger than half the length (>0.5 L) of the side screen 5.

The various aspects and implementations has been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

The reference signs used in the claims shall not be construed as limiting the scope.

The invention claimed is:
1. A device comprising:
a housing;
a roll unit mounted such that it is able to rotate in the housing;
a flexible, touch-sensitive display configured to be rolled on the roll unit around a roll axis so that a first, curved portion of the display forms a side screen bent around said roll unit, and a second, planar portion of the display forms a front screen, wherein the area of said front screen changes according to a rotation of the roll unit; and a controller configured to adjust, in response to detecting a predefined multi-touch gesture on the side screen, an audio output volume of the device;

wherein the controller is further configured to increase said audio output volume to a maximum level based on detecting a single multi-touch gesture comprising two touch inputs simultaneously sliding, in a single motion, from a bottom portion of said side screen to a top portion of said side screen; and wherein the controller is configured to, based on detecting a sliding movement of a moving touch input relative to a stationary touch input:

increase said audio output volume to a higher level based on detecting the moving touch input sliding away from the stationary touch input; and decrease said audio output volume to a lower level based on detecting the moving touch input sliding towards the stationary touch input.

2. The device according to claim 1, wherein said predefined multi-touch gesture comprises two touch inputs detected simultaneously on said side screen, and a predefined movement of at least one of said two touch inputs.

3. The device according to claim 2, wherein said predefined movement further comprises a sliding movement detected substantially parallel to said roll axis; and wherein said controller is configured to only detect said multi-touch gesture if a distance D of said sliding movement is greater than half of the length L of the side screen (D>0.5 L), wherein said length L of said side screen is measured parallel to said roll axis.

4. The device according to claim 3, wherein said predefined movement comprises a sliding movement of two touch inputs in opposite directions, wherein the distance D of said sliding movement is defined as a combined movement distance of the two touch inputs; and wherein the controller is configured to:

increase said audio output volume to a maximum level based on detecting the two touch inputs sliding away from each other; and decrease said audio output volume to a minimum level based on detecting the two touch inputs sliding towards each other.

5. The device according to claim 3, wherein said predefined movement comprises a sliding movement of two touch inputs in the same direction and by the same distance D; and wherein the controller is configured to:

decrease said audio output volume to a minimum level based on detecting the two touch inputs sliding from a top portion of said side screen to a bottom portion of said side screen;

wherein said top portion and said bottom portion are defined as opposite portions of said side screen along said roll axis, determined relative to the orientation of the device.

6. The device according to claim 2, wherein the controller is configured to determine an amount of adjustment of said audio output volume in proportion to a distance D of said predefined movement of at least one of said two touch inputs.

7. The device according to claim 2, wherein the controller is configured to determine an amount of adjustment of said audio output volume in proportion to a speed S of said predefined movement of at least one of said two touch inputs.

8. The device according to claim 2, wherein the controller is configured to only detect said multi-touch gesture if a measured speed S of predefined movement is greater than a predefined speed threshold Ts (S>Ts).

9. The device according to claim 2, wherein said predefined movement further comprises a double-tap gesture, wherein two touch inputs are detected on the side screen simultaneously in a first instance in time, and again in a second instance in time; and wherein the controller is configured to only detect said multi-touch gesture if a time interval T elapsed between said first instance and said second instance is longer than a predefined time threshold Tr (T>Tr).

10. The device according to claim 9, wherein the controller is configured to:

increase said audio output volume to a maximum level if said double-tap gesture is detected in a top portion of said side screen; and decrease said audio output volume to a minimum level if said double-tap gesture is detected in a bottom portion of said side screen;

wherein said top portion and said bottom are defined as opposite portions of the side screen along said roll axis, determined relative to the orientation of the device.

11. The device according to claim 2, wherein said controller is configured to only detect said multi-touch gesture if it occurs in a central portion of said side screen, said central portion being defined by extending within a predefined distance Dp from a centerline C of the side screen, parallel with said roll axis;

wherein said predefined distance Dp is determined so that an area of said central portion is between 70% and 90% of the area of said side screen.

12. The device according to claim 2, wherein said display is configured to be rolled on said roll unit between a rolled-in state and a rolled-out state to various extents, wherein a location of the side screen with respect to the edges of the display changes according to what extent the display is rolled out.

13. The device according to claim 2, wherein a third, planar portion of the display forms a back screen, wherein the area of said back screen changes according to a rotation of the roll unit.

14. A method for controlling audio output volume of a rolling display device, the method comprising:

detecting a predefined multi-touch gesture on a side screen of said rolling display device; and adjusting, by a controller, in response to detecting a predefined multi-touch gesture on said side screen of said rolling display device, an audio output volume of said rolling display device;

increasing, by the controller, said audio output volume to a maximum level based on detecting a single multi-touch gesture comprising two touch inputs simultaneously sliding, in a single motion, from a bottom portion of said side screen to a top portion of said side screen;

increasing said audio output volume to a higher level based on detecting a moving touch input sliding away from a stationary touch input; and decreasing said audio output volume to a lower level based on detecting the moving touch input sliding towards the stationary touch input;

wherein said rolling display device comprises:

a housing;

a roll unit mounted such that it is able to rotate in the housing;

a flexible, touch-sensitive display configured to be rolled on the roll unit around a roll axis so that a first, curved portion of the display forms said side screen bent around said roll unit, and a second, planar portion of the display forms a front screen, wherein the area of said front screen changes according to a rotation of the roll unit; and said controller.

15. The method according to claim 14, wherein said predefined multi-touch gesture comprises two touch inputs detected simultaneously on said side screen, and a predefined movement of at least one of said two touch inputs.

16. The method according to claim 15, wherein said predefined movement comprises a sliding movement detected substantially parallel to said roll axis; and wherein said controller is configured to only detect said multi-touch gesture if a distance D of said sliding movement is greater than half of the length L of the side screen (D>0.5 L), wherein said length L of said side screen is measured parallel to said roll axis.

17. The method according to claim 16, wherein said predefined movement comprises a sliding movement of two touch inputs in the same direction and by the same distance D; and wherein the method further comprises:
decreasing, by the controller, said audio output volume to a minimum level based on detecting the two touch inputs sliding from a top portion of said side screen to a bottom portion of said side screen;

wherein said top portion and said bottom portion are defined as opposite portions of said side screen along said roll axis, determined relative to the orientation of the device.

18. The method according to claim 15, wherein the method further comprises determining an amount of adjustment of said audio output volume in proportion to a distance D of said predefined movement of at least one of said two touch inputs.

19. The method according to claim 15, wherein the method further comprises determining an amount of adjustment of said audio output volume in proportion to a speed S of said predefined movement of at least one of said two touch inputs.

* * * * *